US008160246B2

(12) United States Patent
Kim et al.

(10) Patent No.: US 8,160,246 B2
(45) Date of Patent: Apr. 17, 2012

(54) APPARATUS AND METHOD FOR GENERATING A KEY FOR BROADCAST ENCRYPTION

(75) Inventors: Hwan-joon Kim, Seoul (KR); Dae-youb Kim, Seoul (KR); Weon-il Jin, Suwon-si (KR); Sung-joon Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1439 days.

(21) Appl. No.: 11/245,054

(22) Filed: Oct. 7, 2005

(65) Prior Publication Data

US 2006/0078110 A1  Apr. 13, 2006

(30) Foreign Application Priority Data

Oct. 8, 2004  (KR) .......................... 10-2004-0080218

(51) Int. Cl.
*H04L 9/00* (2006.01)
(52) U.S. Cl. ............ 380/44; 380/30; 380/277; 380/279; 713/163; 713/169; 713/176; 705/51; 705/71
(58) Field of Classification Search .................. 380/255, 380/30, 278, 279, 200, 44, 45, 282, 232, 380/277; 713/169, 176, 163; 705/51, 71
See application file for complete search history.

(56) References Cited

U.S. PATENT DOCUMENTS

| 2002/0104001 | A1* | 8/2002 | Lotspiech et al. ............. 713/163 |
| 2002/0114466 | A1* | 8/2002 | Tanaka et al. ................. 380/232 |
| 2002/0133701 | A1* | 9/2002 | Lotspiech et al. ............. 713/163 |
| 2003/0185399 | A1* | 10/2003 | Ishiguro ........................ 380/281 |
| 2005/0010774 | A1* | 1/2005 | Rose et al. .................... 713/171 |
| 2005/0075986 | A1* | 4/2005 | You et al. ......................... 705/71 |
| 2005/0182931 | A1* | 8/2005 | Robert et al. ................. 713/168 |
| 2005/0271210 | A1* | 12/2005 | Soppera ........................ 380/277 |

OTHER PUBLICATIONS

Bok-Nyong Park et al; "PrecePt: a privacy-enhancing license management protocol for digital rights management"; 1 Dept. of Comput. Sci. & Eng., Korea Univ., Seoul, South Korea; Proceedings of the 18th International Conference on Advanced Information Networking and Application (AINA'04) 0-7695-2051-0/04, IEEE 2004.*

* cited by examiner

*Primary Examiner* — Taghi Arani
*Assistant Examiner* — Jason Lee
(74) *Attorney, Agent, or Firm* — Sughrue Mion, PLLC

(57) ABSTRACT

An apparatus and method for generating a key for a broadcast encryption. The apparatus includes a node secret generator for managing a user that receives broadcast data in a tree structure and for generating a unique node secret for each node in the tree structure. The apparatus also includes an instant key generator for temporarily generating an instant key used at all nodes in common in the tree structure, and a node key generator for generating a node key for each node by operating the node secret generated at the node secret generator and the instant key generated at the instant key generator. Thus, key update can be efficiently achieved.

12 Claims, 6 Drawing Sheets

APPARATUS AND METHOD FOR GENERATING A KEY FOR BROADCAST ENCRYPTION

CROSS-REFERENCE TO RELATED APPLICATIONS

This application claims the benefit under 35 U.S.C. §119 (a) from Korean Patent Application No. 2004-80218 filed on Oct. 8, 2004 in the Korean Intellectual Property Office, the entire disclosure of which is incorporated herein by reference.

BACKGROUND OF THE INVENTION

1. Field of the Invention

The present invention relates generally to an apparatus and method for a broadcast encryption. More particularly, the present invention relates to an apparatus and method for efficiently generating a key for a broadcast encryption.

2. Description of the Related Art

Typically, encryption systems are categorized based on an encryption key management into a symmetric key (or a secret key) encryption system and an asymmetric key (or a public key) encryption system. The symmetric key encryption system, which was primarily used before the public key encryption system was introduced, uses the same key for the encryption and the decryption. For instance, given that a sender encrypts a text message using an encryption key and an encryption algorithm and sends the encrypted message to a receiver, the receiver decrypts the message to obtain the original message using the same encryption key and an encryption algorithm.

The receiver needs to securely exchange the encryption key before cryptographic communications. A third party, who attempts to illegally listen to the cryptographic communications, is not able to obtain the original text message without the encryption key used by the sender and the receiver. However, the greater the number of counterparts that there are in relation to the key management and the encryption, the greater the number of keys there are to be managed. Thus, the key management and the key exchange become problematic.

In contrast, the asymmetric encryption system is based on a mathematical function, and uses a pair of keys, unlike the symmetric encryption system. One of the keys can be obtained and shared by anyone, and the other key is kept secure to one who has the encryption key. The open key is referred to a public key and the key kept secure is referred to as a private key.

For cryptographic communications between the sender and the receiver using the public key, the sender first encrypts and sends a message using the public key of the receiver, and the receiver decrypts the encrypted message using its private key to obtain the original message. Even if someone obtains the encrypted message over the network, it is impossible to decrypt the encrypted message. Thus, the message can be delivered securely. As only an authorized person keeps the private key, the private key is not provided or known to others.

The symmetric key is prevalently used to encrypt and decrypt a broadcast stream. This is because the symmetric key facilitates quite rapid encryption and decryption and is securely exchangeable through a limited access system being accessible only by an authorized user among designated users.

FIG. 1 depicts a network structure of a data transmission system according to a related art broadcast encryption. In FIG. 1, a content creator 100 creates diverse available data including audio data or video data and provides the created data to a service provider 110. The service provider 110 broadcasts the received data to trusted users who pay for the relevant data via a variety of wired or wireless communication networks, for example, broadcasts to a mobile digital rights management (DRM) network 140 and a smart home DRM network 150.

The service provider 110 can transmit data via a satellite 120 to users' devices such as a set-top box 141 that is provided with a satellite receiver, or to a mobile terminal 142 over a mobile communication network. Furthermore, the service provider 110 can transmit data to terminals 150, 151, 152, 153, 154, and 155 in the smart home network 150 via an Internet network 130.

Data is encrypted according to a broadcast encryption (BE) to prevent a piratical user 160 who does not pay for the relevant data from obtaining the data.

The security of the encryption and the decryption depends on a system being in charge of the encryption key management. A great concern in the encryption key management system is key generation. In addition, the management and the update of the created encryption key are also crucial.

FIG. 2 depicts a comparison between the public key algorithm 210 and the BE algorithm 220. Referring to FIG. 2, according to the public key algorithm 210, data including a key for trusted users is transmitted. Specifically, data that the service provider 230 transmits via a broadcast and home network 200 consists of a header 250 and encrypted data 260. The header 250 contains authentication information, and the encrypted data 260 includes actual data information. The header 250 includes a group ID 251 and keys 252, 253, 254, and 255 of authenticated users 281, 282, 283, and 284 in an authenticated group 280 so that the data can be delivered only to the users in the authenticated group 280 among a plurality of users 280, 290 and 291. When the service provider 230 encrypts and transmits the data according to Certificate Revocation List (CRL)/Online Certificate Status Protocol (OCSP) 240, a user receiving the data checks its key information included in the data header 250, normally obtains the authentication, and then utilizes the received data.

According to the BE algorithm 220, a header 270 includes only a group ID 271 and a key 272 of a relevant group. Thus, the trusted users 281, 282, 283, and 284 in the authenticated group 280 can decrypt the received data using their group keys.

Comparing with the public key algorithm 210, the BE algorithm 220 is characterized by the efficient data transmission owing to a relatively small size of the header 270. However, if the group key is hacked, the BE algorithm 220 has to update the keys of all trusted users within the authenticated group.

Meanwhile, U.S. Pat. No. 6,118,873 discloses a system for encrypting broadcast music, videos, and other content. As set forth therein, only authorized player-recorders can play and/or copy the content, and only in conformity with rules established by the vendor of the content. In the encryption method disclosed in the above-referenced patent, authorized player-recorders are issued software-implemented device keys from a matrix of device keys. These keys can be issued simultaneously with each other or over time. In any event, no player-recorder is supposed to have more than one device key per column of the matrix. Although two devices might share the same key from the same column, it is very rare that any two devices share, substantially, exactly the same set keys from all the columns of the matrix. The keys are used to decrypt the content.

In the case where a device (and its keys) becomes compromised deliberately or by mistake, it is necessary to revoke the keys of the device. Revoking a set of keys effectively renders the compromised device (and any clones thereof) inoperable to play content that is produced after the revocation. In the above-referenced patent, about 320 message bytes are required for each revocation. While this is effective, it is desirable to reduce the length of the revocation message even further for better efficiency.

While the system disclosed in the above-referenced patent is effective, because of size constraints of the header area of the message (referred to as "media key block" in the referenced patent), only a relatively limited (10,000 for a 3M header such as DVD-Audio) number of revocations can be made during the life of the system. This number can be increased by increasing the header size, but the added revocations would be applicable only to newly made devices, and not to devices that were made before the header size increase. It is desirable to be able to execute a large number of revocations of both "old" and "new" devices, i.e., to account for stateless receivers. Also, since more than one device can share any particular key with the compromised device in the above-referenced patented invention, revoking a set of device keys might result in revoking some keys held by innocent devices. It is desirable to further reduce the chances of accidentally revoking a "good" device, preferably to zero.

Other methods for broadcasting the encryption include those disclosed in Fiat et al., titled Broadcast Encryption, Crypto '93, LNCS vol. 839, pp. 257-270 (1994). This method envisions removing any number of receivers as long as at most "t" of them collude with each other. However, the Fiat et al. method requires relatively large message lengths, a relatively large number of keys stored at the receiver, and each receiver to perform more than a single decryption operation. Furthermore, the Fiat et al. method does not envision the stateless receiver scenario. It is required to avoid assuming a priori how many receivers might collude. Also, it is required to minimize the message size and number of stored keys and to minimize the number of decryption operations that must be performed by a receiver, thus optimizing performance.

Other encryption systems, like the Fiat et al. system, do not provide for the scenario of stateless receivers, and thus cannot be effectively applied as is to content protection of recorded media. Examples of such systems include the tree-based logical key hierarchy systems disclosed in Wallner et al., titled "Key management for Multicast: Issues and Architectures", IETF draft wallner-key, 1997; Wong et al., titled "Secure Group Communication Using Key Graphs", SIGCOMM 1998; Canetti et al., titled "Multicast Security: A Taxonomy and Some Efficient Constructions", Proc. of INFOCOM '99, vol. 2, pp. 708-716 (1999); Canetti et al., titled "Efficient Communication-Storage Tradeoffs for Multicast Encryption", Eurocrypt 1999, pp. 459-474; and McGrew et al., titled "Key Establishment in Large Dynamic Groups Using One-Way Function Trees", submitted to IEEE Transactions on Software Engineering (1998). With more specificity regarding the methods of Wallner et al. and Wong et al., keys are assigned by assigning an independent label to each node in a binary tree.

FIG. 3 depicts a concept of the BE that assigns keys to a related art tree structure. In FIG. 3, users 32 through 47 receiving data according to the BE algorithm are provided with its unique keys and keys held by nodes being connected in the tree structure.

For example, user 34 can obtain a key of user 34, a key of a node 17, a key of a node 8, a key of a node 4, and a key of a node 2. The key of the node 17 is shared by user 34 and user 35. Likewise, the key of the node 8 is shared by the users of the keys 32, 33, 34, and 35.

If all the users 32 through 47 are trusted, it is desirable to add the key of the node 2 into a header of data ready to transfer and transmit the data to all of the users 32 through 47, to thus securely transmit the data.

If an unreliable user, that is, if a revoked user obtains the key of the user 36, it is required to update the relevant keys because the other nodes share the keys relating to the user 36. For example, it is necessary to update the keys of the node 18, the node 9, the node 4, and the node 2. The updating of the keys is conducted from a lower level to an upper level.

As the key of the node 18 is shared by user 37, the updated key of the node 18 is encrypted from a server for the key of user 37 and transmitted to user 37. Next, as the key of the node 9 is shared by the users 37, 38, and 39 below the node 19, the updated key of the node 9 is encrypted and transmitted to user 37 as the pre-updated key of the node 18. The updated key of the node 9 is encrypted and transmitted to users 38 and 39 as the key of the node 19.

In the same manner, as the key of the node 4 is shared by users 32, 33, 34, and 35 below the node 8 and users 37, 38, and 39 below the node 9, the updated key of the node 4 is encrypted and transmitted to users 32 through 35 as the key of the node 8, and to users 37, 38, and 39 as the pre-updated key of the node 9.

Finally, the key of the node 2 is shared by users 23 through 39, excluding user 36, below the node 4, and users 40 through 47 below the node 5. Accordingly, the updated key of the node 2 is encrypted and transmitted to users 32, 33, 34, 35, 37, 38, and 39 as the pre-updated key of the node 4. The updated key of the node 2 is encrypted and transmitted to users 40 through 47 as the key of the node 5. Therefore, such a key updating can block the access of the illegal or revoked user.

However, according to the related art key update method, some nodes are subjected to changes upon the occurrence of the revoked user. Even if the revokes and batches relating to the key update are carried out with respect to the whole nodes, a receiver requires at least log N times of the key decryptions and r log N times of the key transports. Given a great number of users who receive the broadcast data, the data become enormous. Herein, 'r' is the number of devices to be revoked, and 'N' is the total number of the receivers within the system. Data to be transferred for the key update is not substantially required data but overhead information that greatly decreases the substantial data transfer rate. Thus, a need arises for the more efficient key derivation, key distribution, and key update for the sake of the BE.

SUMMARY OF THE INVENTION

The present invention has been provided to solve the above-mentioned and other problems and disadvantages occurring in the related art methods, and an aspect of the present invention provides an apparatus and method to efficiently generate a key for a broadcast encryption which facilitates key update due to a revoked user.

Another aspect of the present invention provides an apparatus and method to efficiently generate node keys assigned to nodes for a broadcast encryption by combining a fixed node secret and a variable instant key.

To achieve the above aspects of the present invention, an apparatus for generating a key for a broadcast encryption according to an exemplary embodiment of the invention includes a node secret generator for managing a user that receives a broadcast data in a tree structure and generating a unique node secret for each node in the tree structure; an instant key generator for temporarily generating an instant key used at all nodes in common in the tree structure; and a node key generator for generating a node key for each node by operating the node secret generated at the node secret generator and the instant key generated at the instant key generator.

The node key generator may generate the node key from each node having a same length by operating the instant key and the node secret of each node that has a same length.

The node key generator may also generate the node key by hashing the node secret and the instant key.

The node secret is used as a fixed value without updating when the node key is updated. The instant key is managed by mapping a unique identification (ID) to each key. The instant key may be a period key being updated at specific periods. The instant key may be classified according to and is assigned to a content.

Consistent with the above aspect of the present invention, a method for generating a key for a broadcast encryption, comprises: managing a user that receives a broadcast data in a tree structure and generating a unique node secret for each node in the tree structure; temporarily generating an instant key used at all nodes in common in the tree structure; and generating a node key for each node by operating the node secret and the instant key.

Another exemplary method includes generating a node key assigned to each node in the tree structure by combining the fixed node secret and the variable instant key so as to reduce the communication load and the operation load required for the key update when a revoked user occurs.

As it is unnecessary to update the node secret uniquely assigned to each node, the efficient key update can be achieved without conducting the complicated key update as in the related art. By reducing the transmission overhead required to the key update, the performance enhancement and the cost reduction can be attained. Furthermore, the usability can be improved by minimizing the user management required for the key update.

The following explains the key derivation method of the node key assigned to each node in the tree structure, the key management and the key update.

BRIEF DESCRIPTION OF THE DRAWINGS

These and/or other aspects and advantages of the invention will become apparent and more readily appreciated from the following description of exemplary embodiments, taken in conjunction with the accompanying drawing figures of which.

DETAILED DESCRIPTION OF EXEMPLARY EMBODIMENTS OF THE INVENTION

Figure 1:
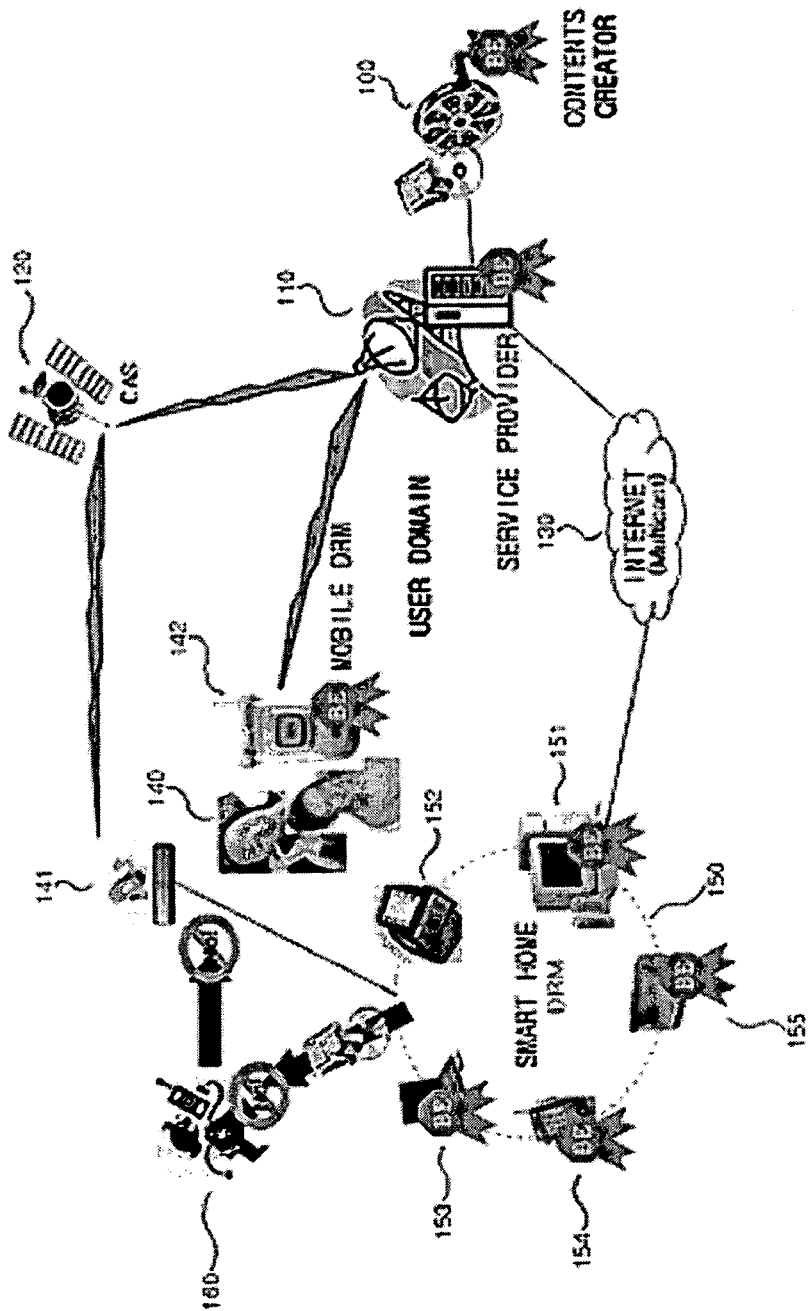
FIG. 1 illustrates a network structure of a data transmission system according to a related art broadcast encryption (BE)
Figure 2:
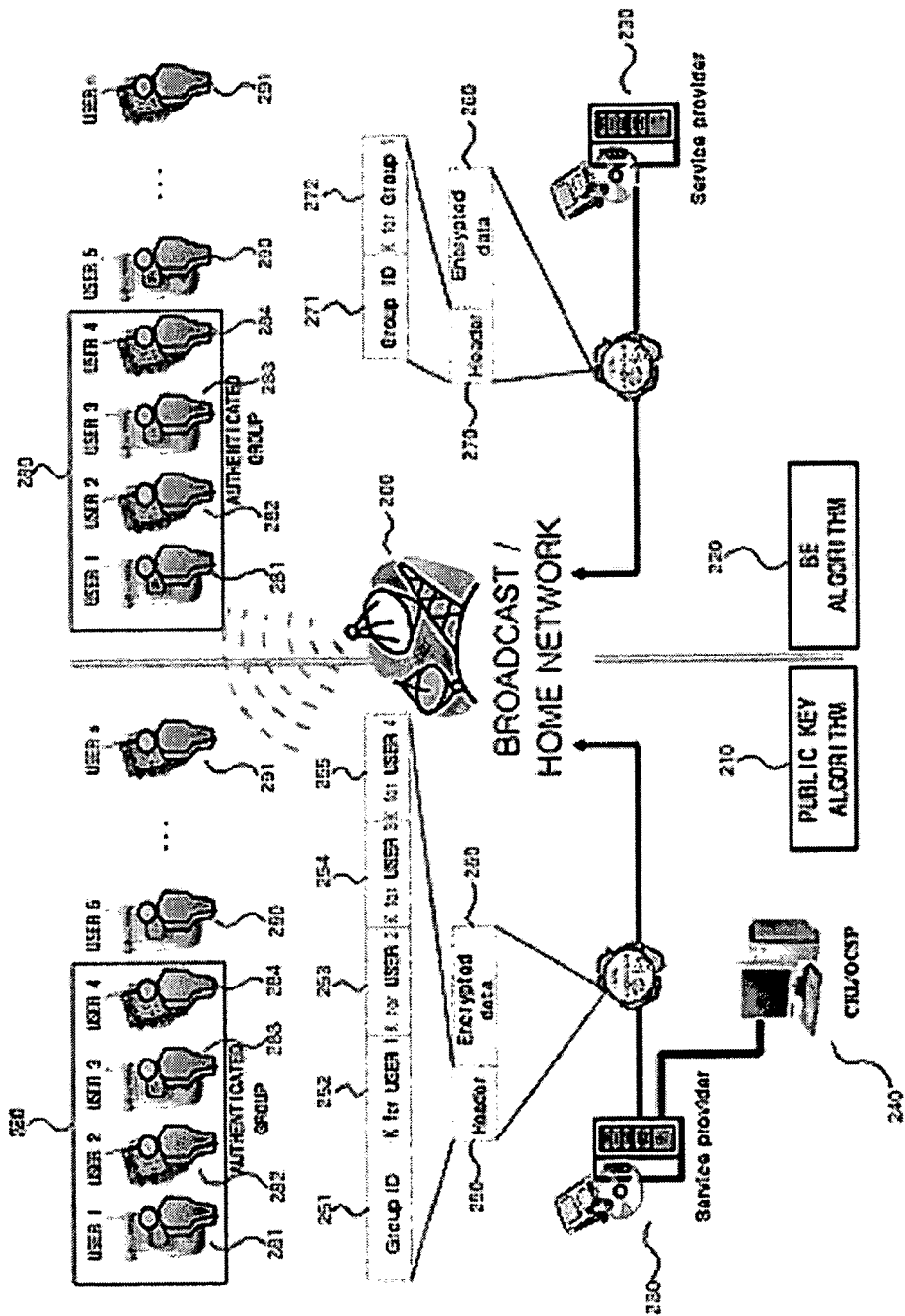
FIG. 2 illustrates a comparison between a public key algorithm and the BE algorithm.

Reference will now be made in detail to embodiments of the invention, examples of which are illustrated in the accompanying drawings, wherein like reference numerals refer to the like elements throughout. The embodiment is described below in order to explain the present general inventive concept by referring to the drawings.

Figure 4:
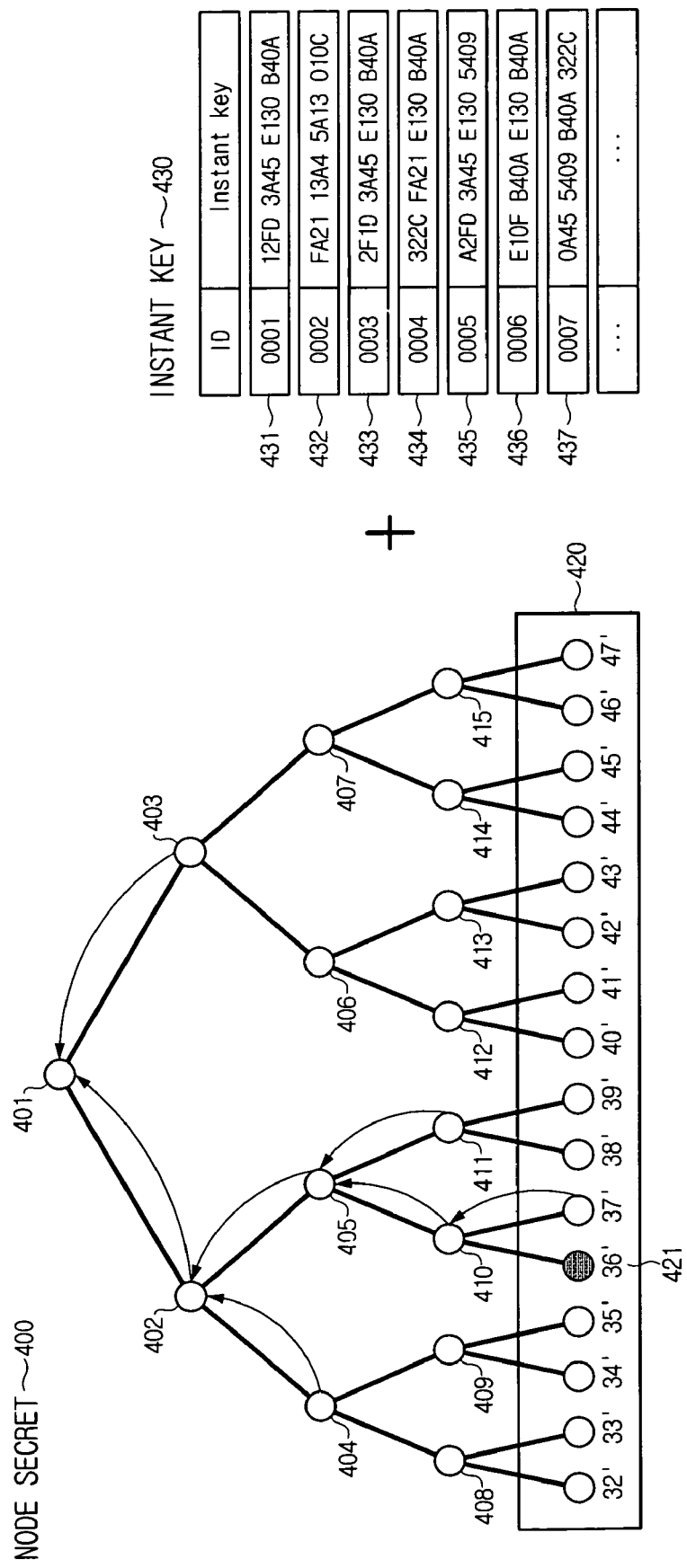
FIG. 4 illustrates a concept of a BE using an instant key according to an embodiment of the present invention.

FIG. 4 depicts a broadcast encryption using an instant key according to an exemplary embodiment of the present invention.

Referring to FIG. 4, a node key, which is assigned to nodes, is generated by combining a fixed node secret 400 and an instant key 430. The node secret 400, which is uniquely utilized at each node, is not updated like node keys used in the related art, but is set to a fixed value. Hence, the complicated update operation of the node secret 400 is not required even when a revoked user occurs.

According to an exemplary embodiment of the present invention, the instant key 430 is used for the operation with the node secret 400 to thus prevent illegal piracy of a revoked user.

The instant key 430 is temporarily used and is variable. If broadcast information ready to deliver to respective users is time-dependent data, it is possible to use the instant key 430 as a period key. The periodical changes of the instant key 430 prevent a revoked user who knows the node secret 400 from obtaining intended content after a prescribed time.

If the instant key 430 is assigned to contents respectively, even a revoked user who knows the node secret 400 is restrained from obtaining and using an unauthorized content due to the changed instant key 430.

According to another exemplary embodiment of the present invention, a node key is derived by combining the unique node secret 400, which is assigned to each node, and the instant key 430. A node key finally generated and received at the users 420 is a combined value of the instant key and the node secret that are assigned for a predetermined time or to a relevant content. The user receiving the data decrypts the data using the node secret 400 of its connected node as received by the user and the instant key 430 as pre-received by the user.

The node secret 400 uniquely assigned to the respective nodes 401 through 415 is continuously used without updating, even if a revoked user 421 appears among users 420 who are receiving data. Accordingly, the complicated key update operation used in the related art is not required.

It is advantageous to manage the instant key 430 as a unique identification (ID) 431 through 437 with respect to the keys assigned for a predetermined time or to contents. For example, if the ID is '0001', '12FD 3A45 E130 B40A' is mapped to the instant key 430 for the management.

It is to be understood that there are various methods to derive the node key for each node by combining the node secret 400 and the instant key 430. For instance, the node key of a node secret 401 can be derived in accordance with the following equation:

$$\text{node key}(401, ID) = \text{hash}(\text{node secret}(401) \| \text{instant key}(ID)) \quad \text{[Equation 1]}$$

In Equation 1, the node key of each node is derived using a hash function with respect to the fixed node secret assigned to a node and the instant key updated by content. In comparison with the related art, the instant key is added but the length of the key finally derived and transmitted is the same owing to the hash function. As a result, the overhead due to the added key does not occur.

It is preferable to use independent codes having no association with each other as the node secret 400 and the instant key 430. As above, the final key is obtained by combining the two codes. The instant key 430 is managed using the respective IDs and the relation with the content to facilitate the tracing of a content user afterwards.

While the related art key update method is likely to lose the key information before the update, the present invention enables use of information relating to a relevant key by connecting the key information relating to the broadcast encryption to the content.

Figure 5:
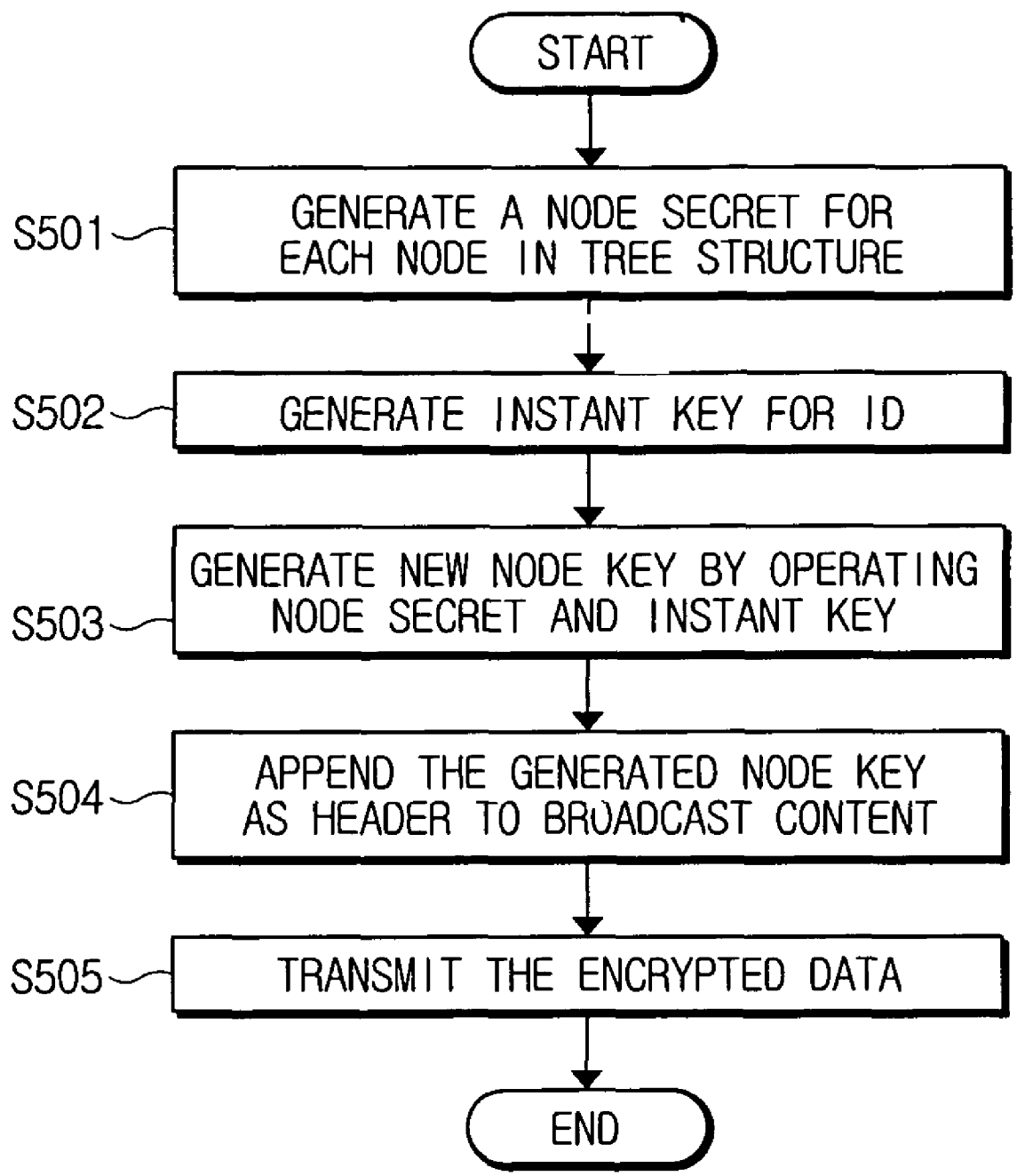
FIG. 5 explains a BE procedure using the instant key according to an exemplary embodiment of the present invention.

FIG. 5 is a flowchart explaining the broadcast encryption procedure using the instant key according to an exemplary embodiment of the present invention.

Referring to FIG. 5, the node secret for each node in the tree structure is generated for the broadcast encryption (S501). Independently from the node secret, the instant key is generated for each ID (S502). Note that the ID may be assigned by the content or by the time period. If the instant key is assigned by the time period, the instant key can be referred to as a period key as mentioned above.

To generate the node key for each node, the generated node secret and the instant key by the ID are operated (503). The obtained node key is appended as header information of the broadcast content (S504), and is transmitted to an intended user together with the encrypted data.

Figure 6:
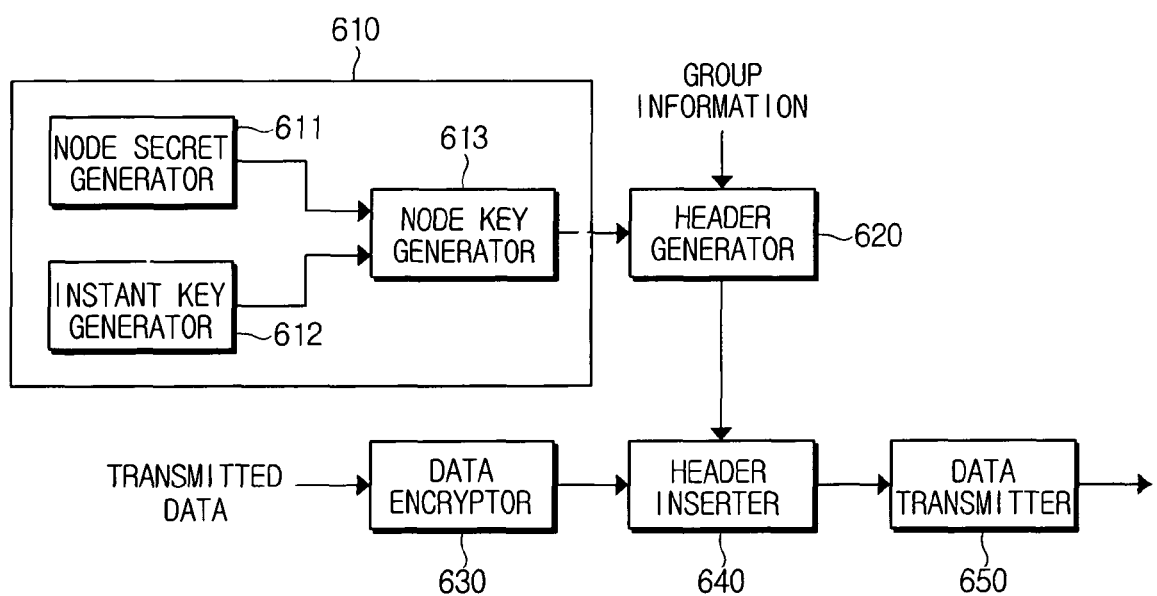
FIG. 6 illustrates a broadcast encryption apparatus using the instant key according to an exemplary embodiment of the present invention.

FIG. 6 is a block diagram of a broadcast encryption apparatus using the instant key according to an exemplary embodiment of the present invention.

In FIG. 6, the broadcast encryption apparatus includes a node key generation device 610, a header generator 620, a data encryptor 630, a header inserter 640, and a data transmitter 650. The node key generator 610 includes a node secret generator 611, an instant key generator 612, and a node key generator 613.

The node key for each node is generated at the node key generation device 610. The node secret generator 611 generates a unique node secret for each node, and the instant key generator 612 generates an instant key used for each ID. Next, the node key generator 613 combines the node secret generated at the node secret generator 611 and the instant key generated at the instant key generator 612, therefore creating a new node key.

The header generator 620 generates header information by selecting a relevant node key among the node keys generated at the node key generator 613 according to group information of the users to which the data is to be transmitted.

The data encryptor 630 encrypts the data to be delivered to the user; that is, encrypts the content, and then the header inserter 640 appends the header information generated at the header generator 620 to the encrypted data. Finally, the data including the header information is transmitted to a receiver side; that is, to the users through the data transmitter 650.

Hereinafter, a description is provided with respect to a performance comparison by applying the encryption key generation method and the related art to illustrative examples.

First, the performance comparison is explained according to the number of revoked users. Given that an encryption key is 128 bits in length according to Advanced Encryption Standard (AES), the total number of users is $2^{24}$ ($\approx$16,880,000), and a key update period is set to 1, the following Table 1 shows a transmission overhead of the related art and the present invention.

TABLE 1

| Revoked users | $2^{10}$ | $2^{16}$ | $2^{20}$ |
|---|---|---|---|
| RFC2627 | 768 | 49152 | 786432 |
| SM03 | 16 | 640 | 6144 |
| Invention | 2 | 128 | 2047 |

Figure 3:
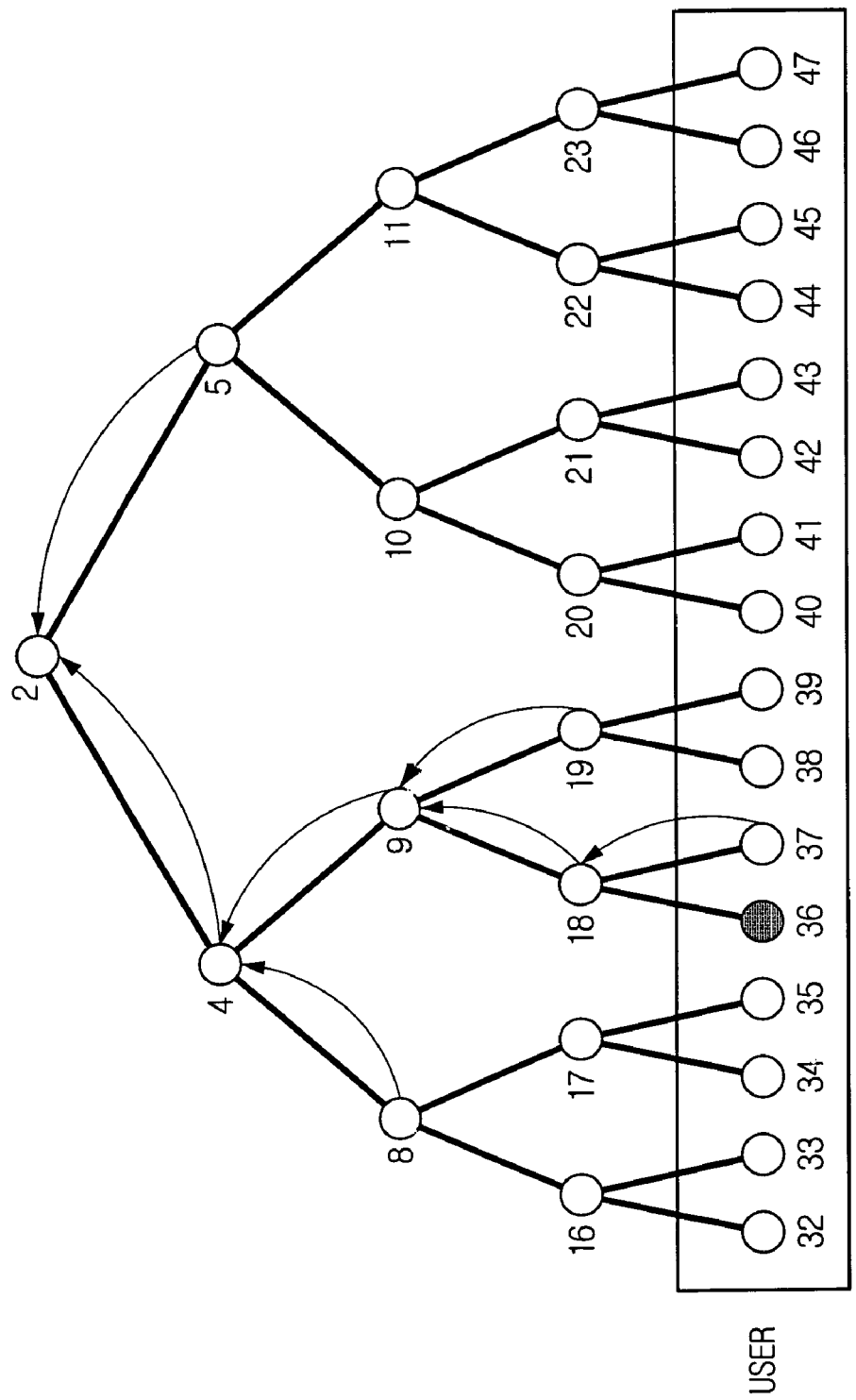
FIG. 3 illustrates a concept of the BE that assigns keys into a conventional tree structure.

In Table 1, RFC 2627 indicates the key update method described in reference to FIG. 3. SM03 is advanced from the RFC2627 and additionally includes the concept of the node secret generated through an exclusive OR operation of the node secret and the node key. It can be seen that the present invention improves the performance about 500~800% over the related art.

The performance in view of a storage of a server and a user is compared. It is assumed that the length of the encryption key is 128 bits according to the AES, the total number of users is 224($\approx$16,880,000), and the number of revoked users is 216($\approx$60,000). The following Table 2 shows a storage overhead of the related art and the present invention.

TABLE 2

| Key update | | 1 time | 10 times | 100 times |
|---|---|---|---|---|
| RFC2627 | User | 384 bytes | 3840 bytes | 38400 bytes |
| | Server | 634.5 Mb | 626.7 Mb | 1548.2 Mb |
| SM03 | User | 768 bytes | 7680 bytes | 76800 bytes |
| | Server | 525.3 Mb | 534.5 Mb | 626.7 Mb |
| Invention | User | 4816 bytes | 4967 bytes | 6416 bytes |
| | Server | 524.3 Mb | 524.3 Mb | 524.3 Mb |

In Table 2, the key update according to the present invention provides better performance as the number of update times increases, than in the related art.

As explained above, as it is unnecessary to update the node secret uniquely assigned to each node, efficient key update can be achieved without conducting the complicated key update as in the related art. By reducing the transmission overhead required for the key update, performance enhancement and cost reduction can be attained. Furthermore, usability can be improved by minimizing the user management required for the key update.

The reduced overhead for the key update can reduce the communication load and the operation load. The simplified key update can also reduce a user's concern regarding security. In addition, it is possible to manage a revoked user more specifically and efficiently, and the efficiency of the broadcast encryption system can be prevented from deteriorating.

Although exemplary embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A broadcast encryption apparatus comprising:
   a node key generation device for generating a node key for each node;
   a header generator for generating header information by selecting a relevant node key among the node keys generated at the node key generator according to group information of users to which data is to be transmitted;
   a data encryptor for encrypting the data to be delivered to the users;
   a header inserter for appending the header information generated by the header generator to the encrypted data; and
   a data transmitter for transmitting the data including the header information to a receiver side,
   wherein the node key generation device comprises:
      a node secret generator for managing a user that receives a broadcast data in a tree structure and generating a unique node secret for each node in the tree structure;

an instant key generator for temporarily generating an instant key used at all nodes in common in the tree structure; and a node key generator for generating a node key for each node by operating the node secret generated at the node secret generator and the instant key generated at the instant key generator, and wherein the broadcast data is decrypted by a combined value of the node secret and the instant key as they are received by the user which receives the broadcast data, wherein the node key generator generates the node key for each node having a same length by operating the instant key and the node secret of each node that has a same length.

2. The apparatus according to claim 1, wherein the node key generator generates the node key by hashing the node secret and the instant key.

3. The apparatus according to claim 1, wherein the node secret is used as a fixed value without updating when the node key is updated.

4. The apparatus according to claim 1, wherein the instant key is managed by mapping a unique identification (ID) to each key.

5. The apparatus according to claim 1, wherein the instant key is a period key being updated at specific periods.

6. The apparatus according to claim 1, wherein the instant key is classified according to and is assigned to a content.

7. A method for generating a key for a broadcast encryption apparatus, comprising the steps of:

managing by the broadcast encryption apparatus a user that receives a broadcast data in a tree structure and generating a unique node secret for each node in the tree structure;

temporarily generating by the broadcast encryption apparatus an instant key used at all nodes in common in the tree structure; and generating a node key for each node by operating the node secret and the instant key, wherein the broadcast data is decrypted by a combined value of the node secret and the instant key as they are received by the user which receives the broadcast data, wherein the generating of the node key generates the node key for each node having a same length by operating the instant key and the node secret of each node that has a same length.

8. The method according to claim 7, wherein the generating of the node key generates the node key by hashing the node secret and the instant key.

9. The method according to claim 7, wherein the node secret is used as a fixed value without updating when the node key is updated.

10. The method according to claim 7, wherein the instant key is managed by mapping a unique identification (ID) to each key.

11. The method according to claim 7, wherein the instant key is a period key being updated at specific periods.

12. The method according to claim 7, wherein the instant key is classified according to and is assigned to a content.

* * * * *